(12) United States Patent
Corodemus et al.

(10) Patent No.: US 10,293,526 B2
(45) Date of Patent: May 21, 2019

(54) SLEEPING PRODUCTS HAVING FIBERS INFUSED WITH COOLING GEL, MOLD RELEASE COOLING GELS AND METHODS THEREFOR

(71) Applicant: Comfort Revolution, LLC, West Long Branch, NJ (US)

(72) Inventors: Dimitrios S. Corodemus, West Long Branch, NJ (US); Beat B. Niederoest, Jr., Medford Lakes, NJ (US); Michael Mozeika, III, West Berlin, NJ (US)

(*) Notice: Subject to any disclaimer, the term of this patent is extended or adjusted under 35 U.S.C. 154(b) by 0 days.

(21) Appl. No.: 15/186,781

(22) Filed: Jun. 20, 2016

(65) Prior Publication Data

US 2016/0368185 A1 Dec. 22, 2016

Related U.S. Application Data

(60) Provisional application No. 62/298,868, filed on Feb. 23, 2016, provisional application No. 62/204,725, filed on Aug. 13, 2015.

(51) Int. Cl.

| | |
|---|---|
| *B29C 44/14* | (2006.01) |
| *B29C 33/60* | (2006.01) |
| *B29C 37/00* | (2006.01) |
| *B29K 75/00* | (2006.01) |
| *B29K 105/04* | (2006.01) |

(Continued)

(52) U.S. Cl.
CPC .............. *B29C 44/14* (2013.01); *B29C 33/60* (2013.01); *B29C 37/0032* (2013.01); *B29C 44/32* (2013.01); *B29C 2037/0035* (2013.01); *B29K 2009/06* (2013.01); *B29K 2021/003* (2013.01); *B29K 2075/00* (2013.01); *B29K 2105/0061* (2013.01); *B29K 2105/04* (2013.01);

(Continued)

(58) Field of Classification Search
CPC .... C08J 9/0009; B29C 44/14; B29C 37/0032; B29C 44/32; B29C 33/60; B29C 2037/0035; B32B 5/20; B29K 2105/0061; B29K 2009/06; B29K 2021/003; B29K 2075/00; B29K 2105/04; B29L 2031/751; B29L 2009/00

See application file for complete search history.

(56) References Cited

U.S. PATENT DOCUMENTS

| | | | |
|---|---|---|---|
| 8,205,592 B2* | 6/2012 | Byer | ................... B29C 44/1219 123/198 D |
| 2007/0135878 A1* | 6/2007 | Lachenbruch | ......... A61G 7/057 607/108 |

(Continued)

*Primary Examiner* — Robert J Grun
*Assistant Examiner* — Jerzi H Moreno Hernandez
(74) *Attorney, Agent, or Firm* — Middleton Reutlinger

(57) ABSTRACT

A method of making a sleep product having a cooling gel layer includes providing a mold, coating the mold with a composite material including a mold release and a cooling gel, and introducing a foaming mixture into the mold so that the foaming mixture is in contact with the composite material. The foaming mixture is allowed to rise and cure into a foam layer having an outer surface covered by the composite material. The composite material is both a mold release coating that facilitates removing the foam layer from the mold and a cooling gel coating that remains on the outer surface of the foam layer after the foam layer has been removed from the mold to provide a cooling effect at the outer surface of the foam layer.

1 Claim, 13 Drawing Sheets

(51) Int. Cl.
*B29K 105/00* (2006.01)
*B29L 31/00* (2006.01)
*B29L 9/00* (2006.01)
*B29C 44/32* (2006.01)
*B32B 5/20* (2006.01)
*C08J 9/00* (2006.01)
*B29K 9/06* (2006.01)
*B29K 21/00* (2006.01)

(52) U.S. Cl.
CPC ..... *B29L 2009/00* (2013.01); *B29L 2031/751* (2013.01); *B32B 5/20* (2013.01); *C08J 9/0009* (2013.01)

(56) References Cited

U.S. PATENT DOCUMENTS

| | | | | |
|---|---|---|---|---|
| 2013/0296449 | A1* | 11/2013 | Peterson | C08J 9/0009 521/122 |
| 2014/0138014 | A1* | 5/2014 | Chaudhry | B32B 5/18 156/77 |
| 2014/0141233 | A1* | 5/2014 | Crawford | C08K 5/03 428/319.7 |
| 2014/0208518 | A1* | 7/2014 | Corodemus | A47G 9/0246 5/691 |
| 2014/0353252 | A1* | 12/2014 | Hester | E21B 43/26 210/640 |
| 2016/0073800 | A1* | 3/2016 | Ives | B29C 44/1233 5/636 |
| 2016/0262403 | A1* | 9/2016 | Peterson | C08G 18/6492 |

* cited by examiner

SLEEPING PRODUCTS HAVING FIBERS INFUSED WITH COOLING GEL, MOLD RELEASE COOLING GELS AND METHODS THEREFOR

CROSS REFERENCE TO RELATED APPLICATIONS

The present application claims benefit of U.S. Provisional Application No. 62/298,868, filed Feb. 23, 2016, and U.S. Provisional Application No. 62/204,725, filed Aug. 13, 2015, the disclosures of which are hereby incorporated by reference herein.

BACKGROUND OF THE INVENTION

Field of the Invention

The present application generally relates to sleeping products and more particularly relates to sleeping products, such as pillows, having fibers and layers infused with cooling gels and to methods of making the sleeping products.

Description of the Related Art

Products having cooling gel layers are effective at providing a cooling effect on the skin. FIG. 9 shows a foam pillow 14 having a continuous cooling gel layer 16 provided over a top surface of the pillow. Foam is not a good conductor of heat, and the gel layer is provided to conduct heat away from the individual's skin contacting the gel layer. FIG. 10 shows a foam mattress 18 having a continuous cooling gel layer 20 over the top surface of the foam mattress. The gel layer provides a cooling sensation due to heat conduction.

The cooling gel layers shown in FIGS. 9 and 10 are effective for providing a cooling effect for an individual using the pillow and mattress because the gel material conducts heat away from the body to cool the body.

Some products have one or more gel layers that cover less than 100% of a surface. In these products, the gel layers may be patches that cover areas of the surface. The gel layers may be spaced from one another over the surface.

Thus, there remains a need for products such as pillows, mattresses and mattress toppers that use cooling gel to achieve a cooling effect

SUMMARY OF THE INVENTION

In one embodiment, the present application is directed to treating natural and synthetic fibers with cooling gels. In one embodiment, the present application seeks to coat the fibers individually so that the material remains porous and allows air to pass therethrough. In one embodiment, the present application seeks to avoid completely coating a surface of fiber based material or a foam layer with a cooling gel, which will render the surface non-permeable and not allow air to pass therethrough.

These and other preferred embodiments of the present invention will be described in more detail below.

DETAILED DESCRIPTION

Figure 1:
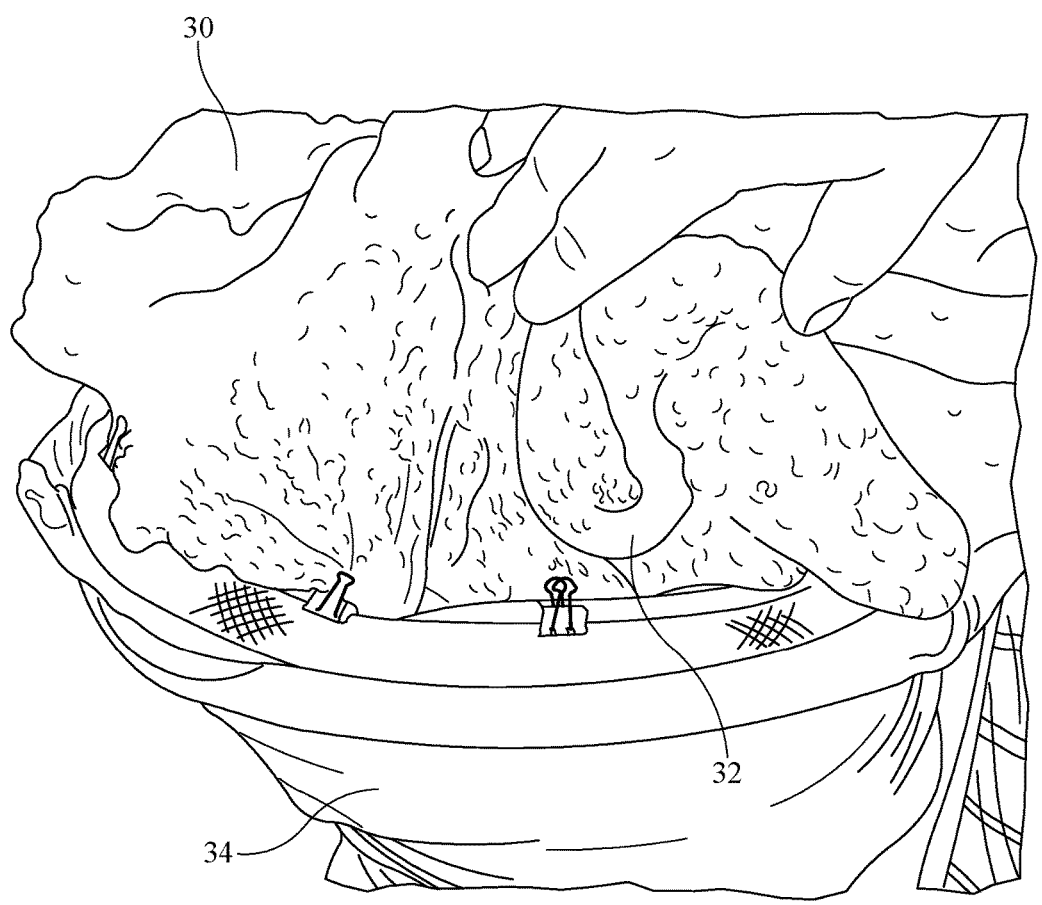
FIG. 1 shows a sleep product having garneted fiber.

Referring to FIG. 1, in one embodiment, garneted fiber 30 is infused with cooling gel 32. In one embodiment, an exposed surface of the garneted fiber is sprayed with a solution containing of cooling gel that binds to the individual fibers. The cooling gel may include a solvent, cooling gel and/or a phase change material that is atomized and sprayed onto the garneted fiber. The cooling gel is then cured, such as by using heat or by allowing the cooling gel to cure in ambient conditions. In one embodiment, the present invention uses a cooling gel solution disclosed in US 2014/0141233 assigned to Peterson Chemical Technology, Inc., the disclosure of which is hereby incorporated by reference herein. In one embodiment, the treated garneted fiber may be exposed, interior, or both. The percentage of the garneted fiber that is treated may be between 1-100%.

In one embodiment, the cooling gel may be rolled onto the garneted fiber for infusing the individual fibers with the cooling gel.

In one embodiment, the cooling gel preferably bonds to the individual fibers and does not form a continuous masking layer that would render the substrate impermeable to air passing through the substrate. The present invention seeks to maintain permeability and air flow through the fibers that have been treated with the cooling gel.

In one embodiment, 100% of the garneted fiber may be infused with the cooling gel. In other embodiments, only a portion of the garneted fiber is treated with the cooling gel. The percentage of treatment may be anywhere between 0-100%.

The garneted fibers that have been infused with cooling gel may be incorporated into a broad range of products including bedding, mattresses, mattress toppers, pillows 34 (FIG. 1), sheets, bed covers, textile fabrics, clothing, sleeping bags, and slippers. In one embodiment, a section or sheet containing gel infused fibers may be incorporated into an object such as a mattress, a mattress topper, slippers, etc. The section or sheet containing gel infused fibers may be quilted into an object.

Figure 2:
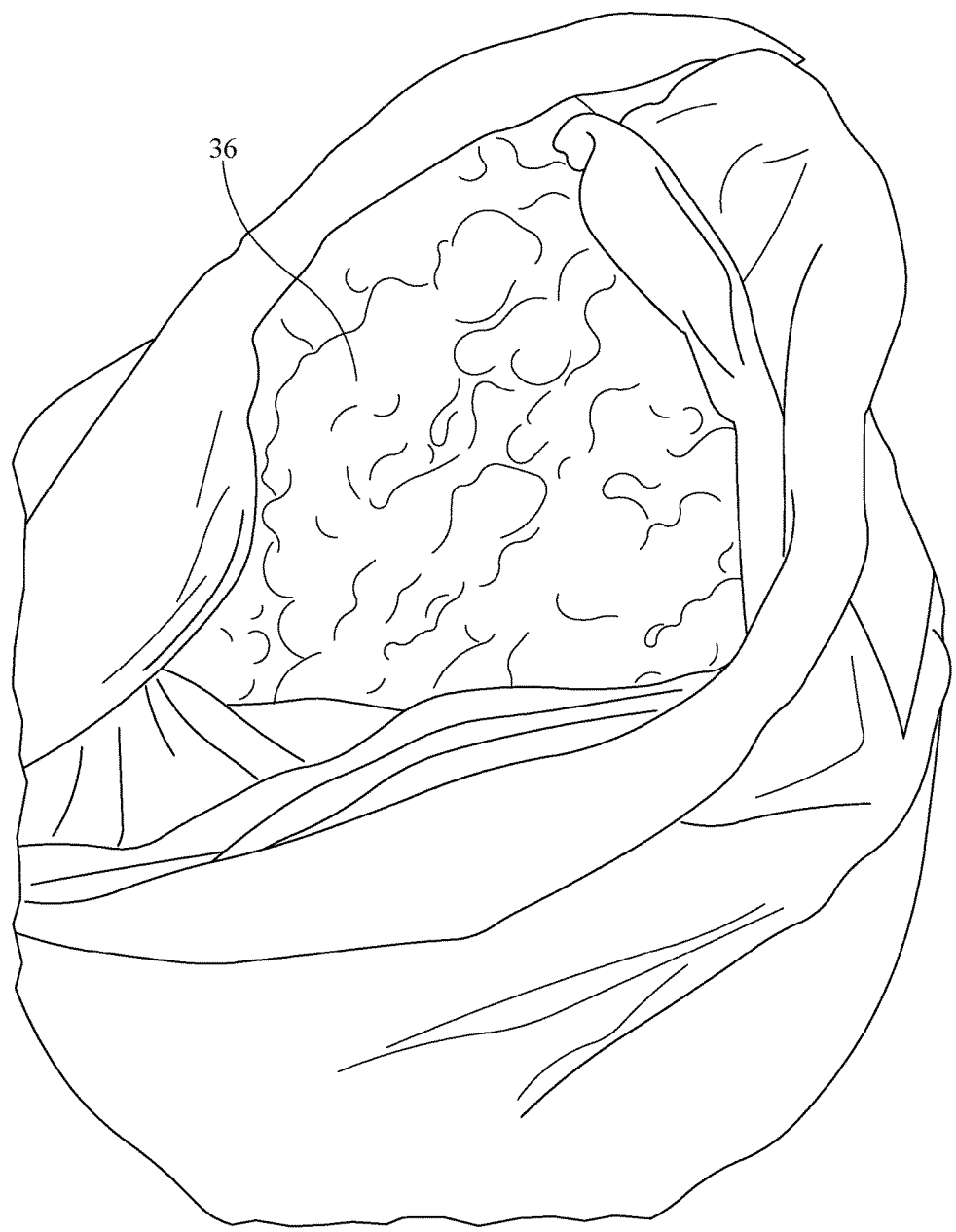
FIG. 2 shows air blow fiber infused with cooling gel.

Referring to FIG. 2, in one embodiment, fibers 36 are infused with cooling gel before being air blown into an enclosure such as a pillow case. The cooling gel may be sprayed onto the air blown fibers. The cooling gel is preferably cured after being sprayed onto the individual fibers. In one embodiment, the fibers are coated with cooling gel in a batch. The percentage of coating can be anywhere between 0-100% of the fibers being coated. In one embodiment, 100% of the air blown fibers are coated with cooling gel. In one embodiment, 50% of the air blown fibers are coated with a cooling gel and the remaining 50% of fibers are not infused with a cooling gel.

In one embodiment, the treated fibers may be mixed or blended and air blown into an enclosure (e.g., a pillow case). A preferred process preferably spins and fluffs the treated fiber material.

As the gel infused fibers are air blown into an enclosure, the fibers are preferably metered (e.g., weighed) to insure that a consistent amount/volume of cooling gel infused fibers are placed inside each enclosure.

Figure 3:
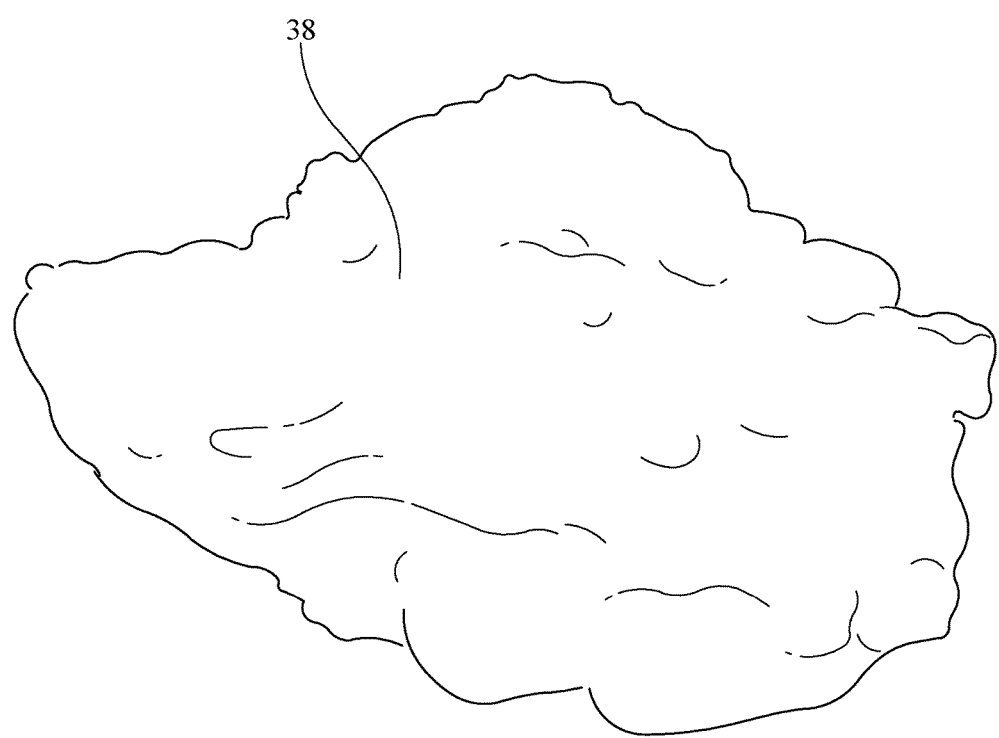
FIG. 3 shows carded fiber before being infused with cooling gel.

Referring to FIG. 3, in one embodiment, the fiber material 38 is preferably carded. In this embodiment, the fiber material 38 is carded and then infused with a cooling gel as described above so that the individual fibers are infused with cooling gel. As described above, it is undesirably to form a masking layer of cooling gel over a surface of the fibers. It is desirably to maintain a porous coating of the cooling gel so that the fiber material remains permeable and so that air may flow through the cooling gel infused fiber material.

Figure 4:
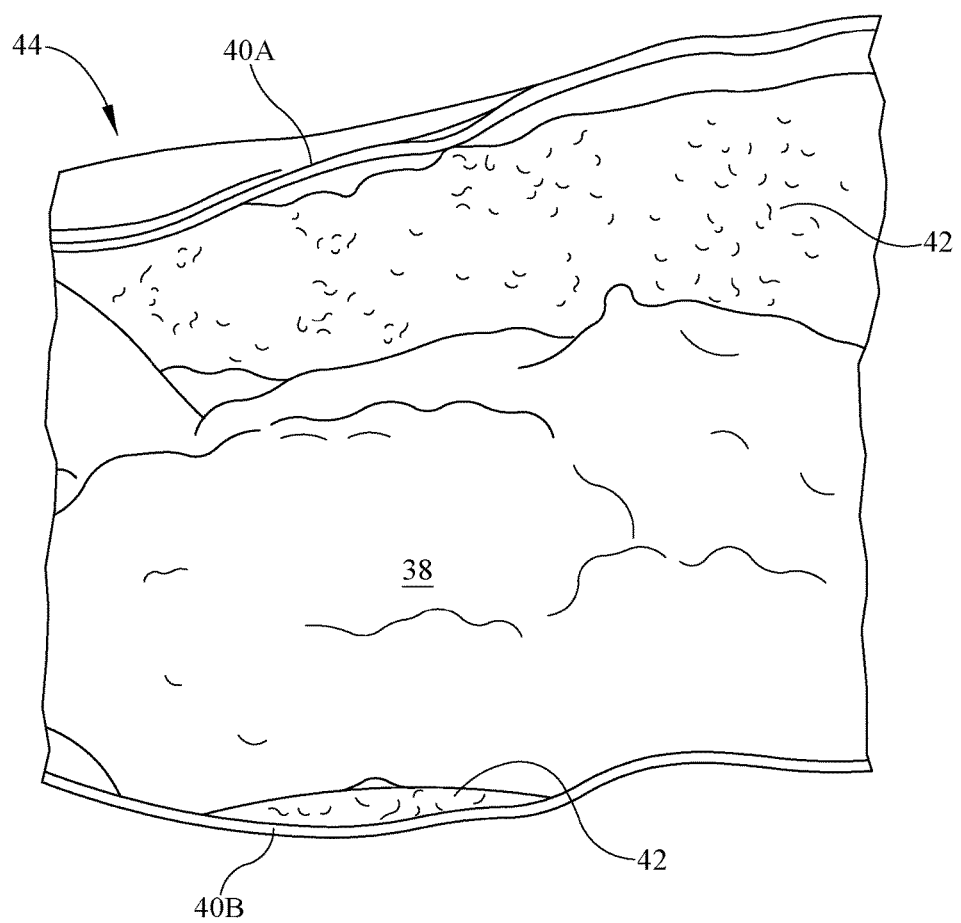
FIG. 4 shows a sleep product having outer layers coated with a cooling gel.

Referring to FIG. 4, in one embodiment, a sheet of material 40 is infused with cooling gel 42. In one embodiment, the sheet of material may be flexible and/or porous. The cooling gel may be sprayed onto one or more surfaces of the sheet of material 40A, 40B or may be rolled onto one or more surfaces of the sheet of material. The cooling gel may cover the entire surface of the sheet of material or may cover only a portion of the surface of the sheet of material. The sections treated with the cooling gel may be nonpermeable (i.e., providing for no air flow) and the untreated sections may be permeable (i.e., providing for air flow). In one embodiment, the sections treated with cooling gel may be permeable and the untreated sections may also be impermeable. In this embodiment, the treated sections are generally less permeable than the untreated sections.

FIG. 4 shows textile fabric used for making objects such as a pillow cover 44. In FIG. 4, the textile cover is turned inside out and the exposed surfaces are sprayed or roll coated with a cooling gel. The cooling gel is cured. The cover may have closures such as buttons and zippers. After treatment, the cover is inverted to right side out and filled with fiber material 38. The fiber material may include fibers infused with cooling gel. In other embodiments, the sheets may be coated with the cooling gel and then sewn together to form an enclosure.

The textile fabric may be used for making other objects such as clothing, bed sheets, apparel, clothing, covers, mattresses, mattress toppers, sleeping bags, quilted items, slippers, etc. In one embodiment, the original form of the textile fabric may be free of bindings and is intended to be cut and sewn into various componentry.

In one embodiment, a roller used for rolling the cooling gel onto fiber material may be made of a broad range of materials including rubber, foam, wool, etc. The cooling gel may be cured using heat and air to accelerate curing or may be cured using ambient air.

Figure 5:
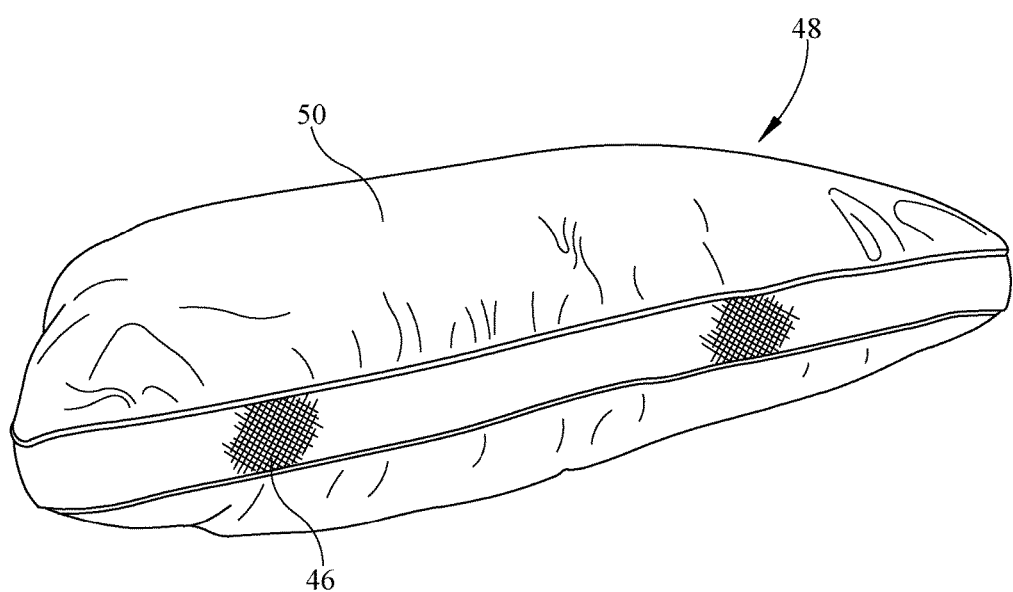
FIG. 5 shows a sleep product having a porous spacer fabric.

Referring to FIG. 5, in one embodiment, a section of porous spacer fabric 46 is incorporated into a cover 48 to allow for air flow through the cover. Sections 50 of the cover 48 are preferably treated with a cooling gel, which may inhibit air flow through the treated sections. In order to provide for air flow, the porous spacer fabric is incorporated into the cover to provide a porous section that allows air to flow into and out of the cover.

The cover shown in FIG. 5 may have a closure element such as a zipper.

Figure 6:
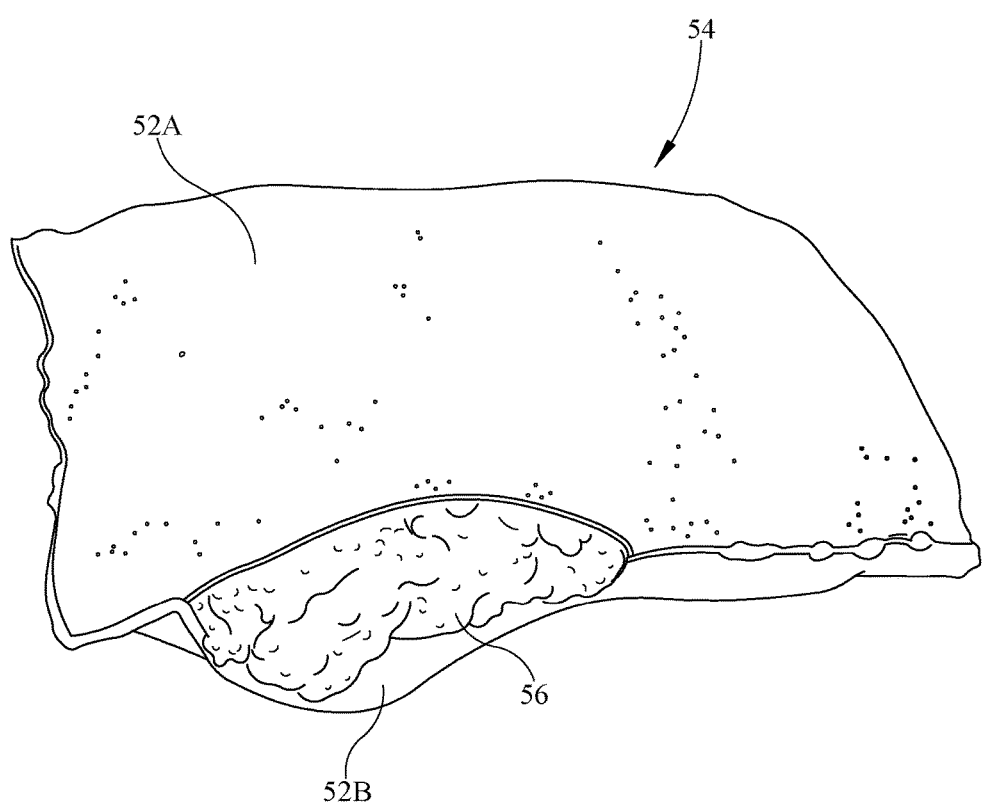
FIG. 6 shows a sleep product having foam layers infused with cooling gel.

Referring to FIG. 6, in one embodiment, foam layers 52A, 52B may be used to make an outer shell 54 and fiber material 56 may be inserted into the outer shell. The foam layers may be sewn together to make the outer shell. In one embodiment, the foam layers of the outer shell are coated with a cooling gel. In one embodiment, 1-100% of the surface area of the foam layers of the outer shell is coated with a cooling gel. The cooling gel may be provided on the foam layers using spraying or rolling techniques. The fibers inserted into the outer shell may be infused with cooling gel as described above for the embodiments shown in FIGS. 1-3. The percentage of fiber material that is infused with cooling gel may be between 0-100%. The fiber material may be garneted fiber, air blown fiber, or carded fiber. In one embodiment, the outer shell may be filled with other fill material such as chopped foam, chopped latex, and/or other well known filling materials.

In one embodiment, the outer shell may be made using latex or fiber layers, and the latex or fiber layers may be infused with cooling gel as described herein.

Figure 7:
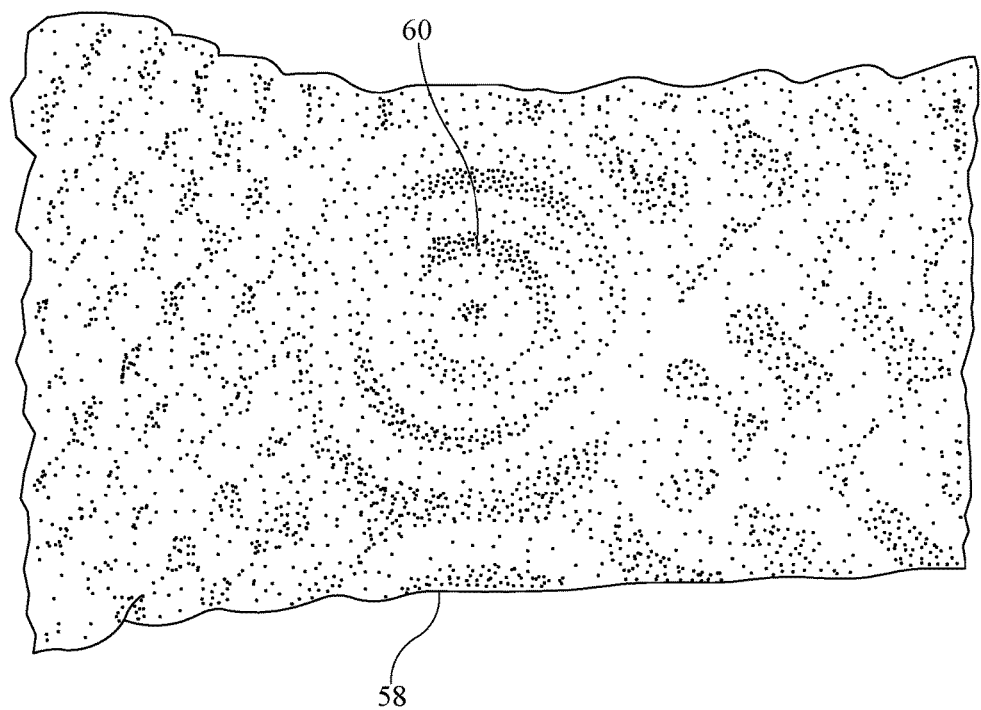
FIG. 7 shows a foam layer having a convoluted top surface that is coated with a cooling gel.

Referring to FIG. 7, in one embodiment, a cooling gel is preferably applied to a foam layer 58 by spraying the cooling gel 60 onto the foam layer. In one embodiment, the foam layer has a convoluted top surface having a pattern of ridges and valleys formed on the top surface. The cooling gel is sprayed onto the convoluted top surface. Spraying the atomized cooling gel enables the gel to completely cover the valleys and ridges of the convoluted top surface. In one embodiment, only certain regions of the foam layer are covered by the cooling gel and other areas of the foam layer remain untreated. In one embodiment, a cooling gel may be applied to a convoluted surface of a foam layer, a smooth/flat surface of a foam layer, or both the convoluted surface and the smooth/flat surface of a foam layer.

The foam layer may be made using surface modification technology (SMT) provided by FoamEx, also known as FXI of Media, Pa.

In one embodiment, the top surface of the foam layer may be smooth.

In one embodiment, the cooling gel may be rolled or brushed onto the top surface of a foam layer, either a convoluted foam layer or a smooth foam layer.

Figure 8:
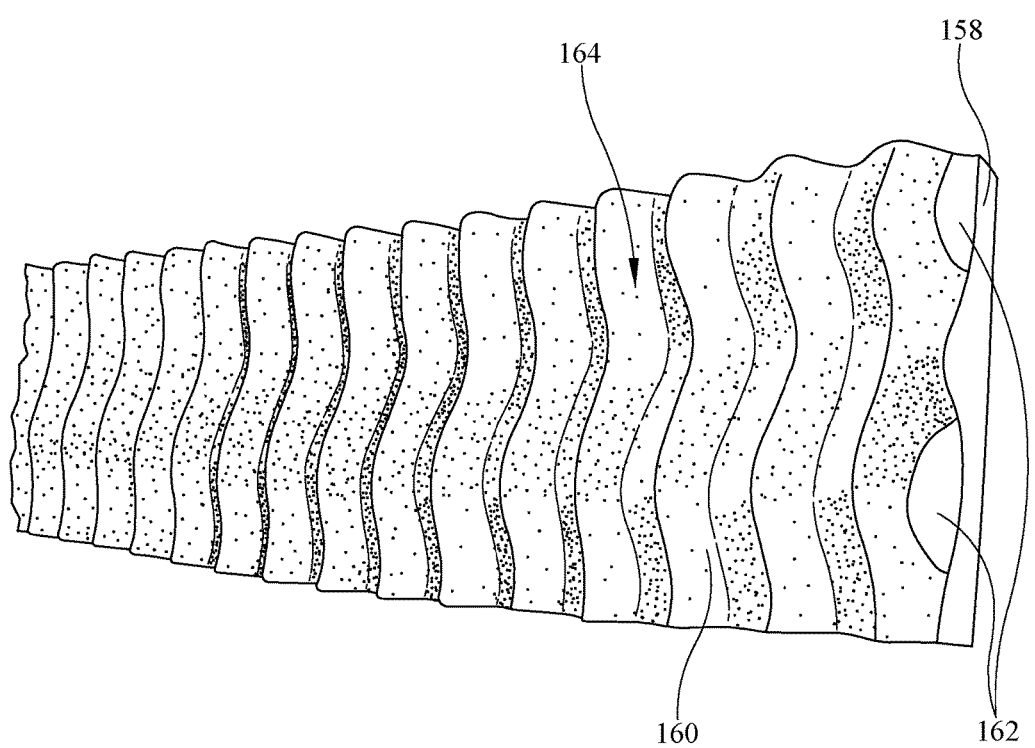
FIG. 8 shows a foam layer having a convoluted top surface having some valleys coated with a cooling gel layer and some valleys not coated with the cooling gel.
Figure 9:
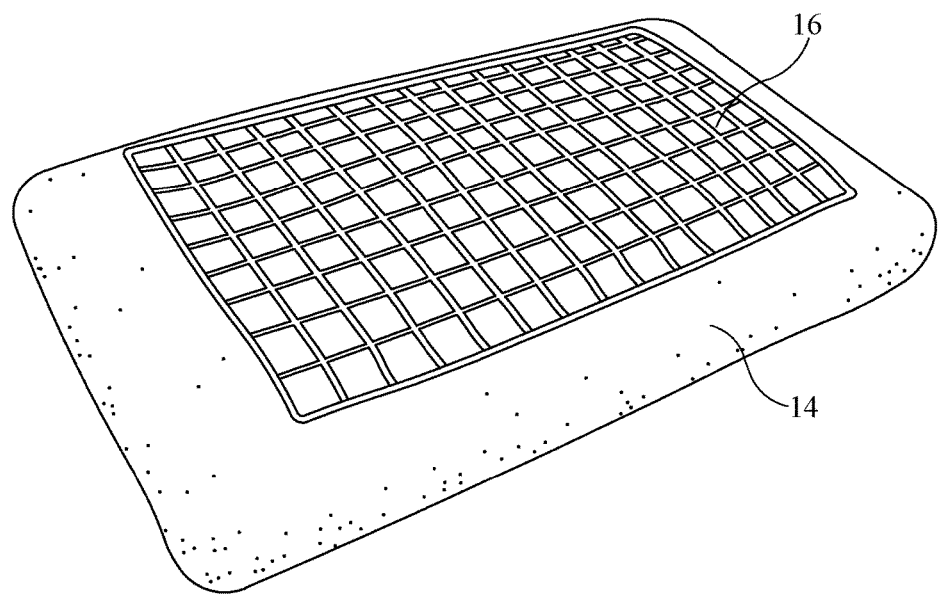
FIG. 9 shows a foam pillow having a nonpermeable gel layer.
Figure 10:
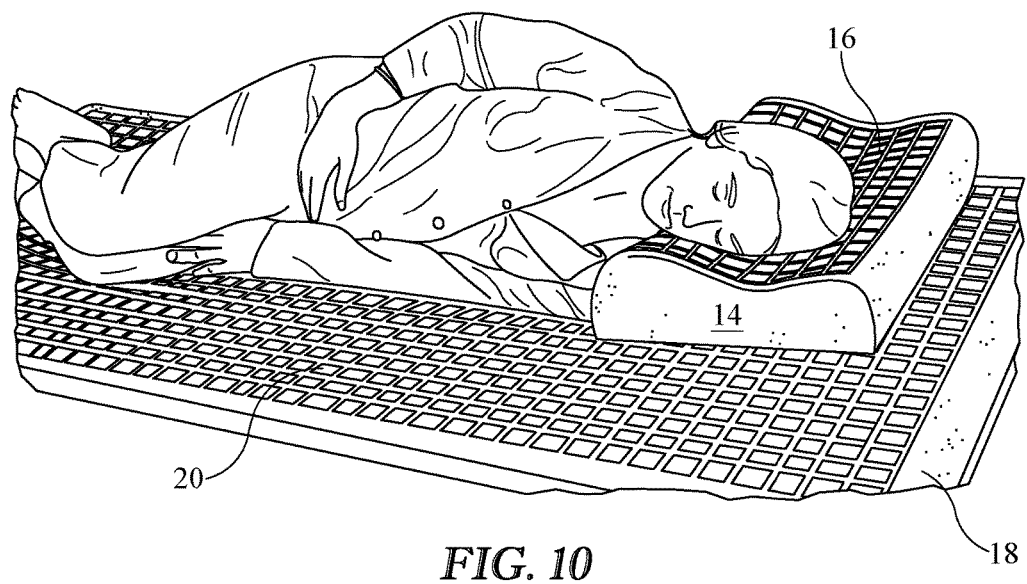
FIG. 10 shows a foam mattress having a nonpermeable gel layer.

FIG. 8 shows some of the deficiencies that may occur when rolling a cooling gel 160 onto a convoluted top layer of foam 158. The roller may not be able to fully engage all of the valleys 162 of the convoluted foam layer 164 so that some of the valleys may remain untreated by the cooling gel. In one embodiment, in order to overcome this problem, it may be advisable to spray coat the cooling gel 160, such as an atomized cooling gel, onto the convoluted top layer of the foam.

Figure 11A:
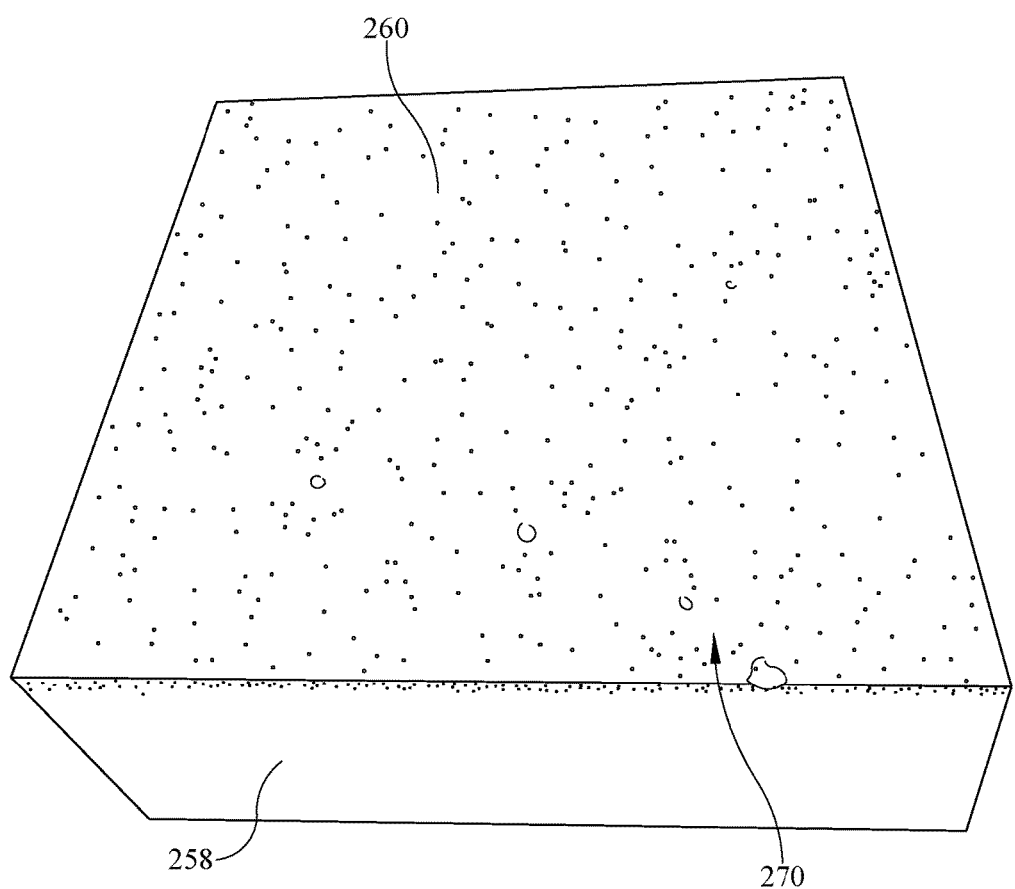
FIG. 11A shows a foam layer having a porous surface infused with a cooling gel.
Figure 11B:
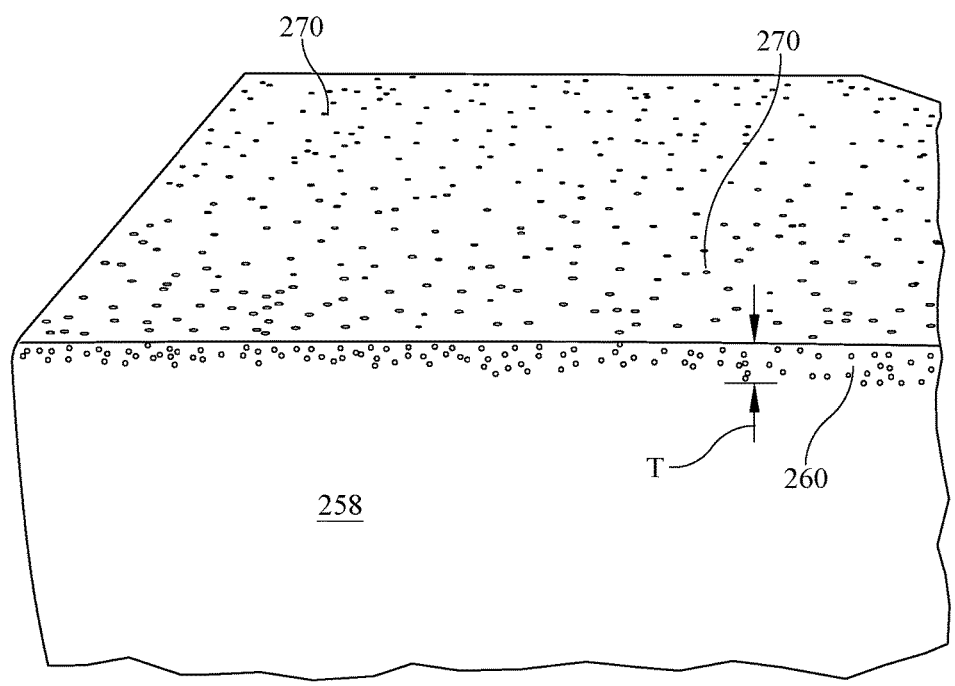
FIG. 11B shows a side view of the foam layer of FIG. 11A.

Referring to FIGS. 11A and 11B, in one embodiment, compliant foam material 258 for use in sleeping products has a porous surface 270 that is infused with a cooling gel 260. As shown in FIG. 11B, the infused cooling gel 260 has a thickness T that defines a cooling gel layer or zone that extends into the porous surface. In one embodiment, the cooling gel coats the inner surfaces of the pores. The pores, infused with the cooling gel 260, allow air to get into and out of the foam material and/or sleep product containing the foam material.

In one embodiment, a compliant foam material may have a skin, such as a non-porous skin, and cooling gel may be applied over the non-porous skin of the foam material. The cooling gel may define a non-porous or porous layer that overlies the skin.

Figure 12:
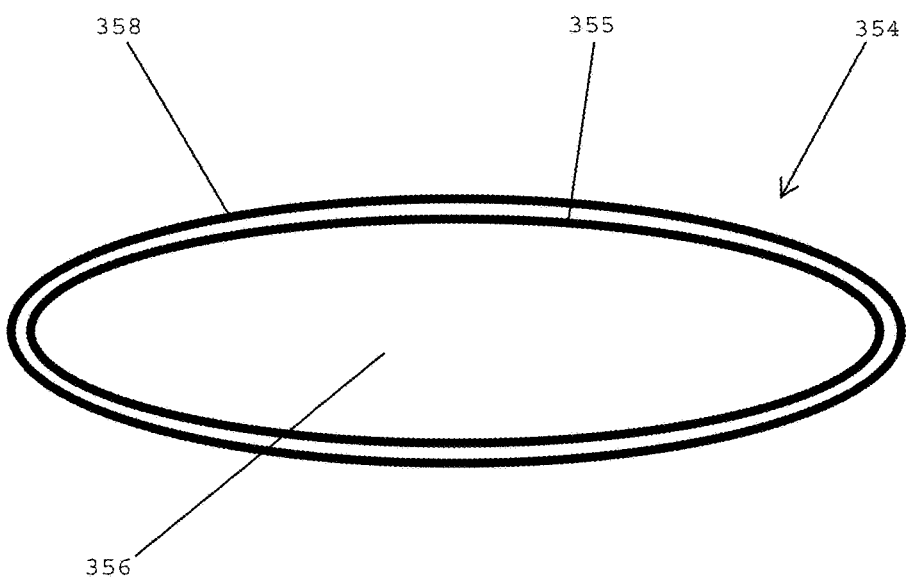
FIG. 12 shows a cross-sectional view of a sleep product having an outer cover, an inner cover, and a compliant fill material disposed in the inner cover.

In one embodiment, a sleep product, such as a pillow, has a layer with a cooling gel infused into or applied to the layer. Referring to FIG. 12, in one embodiment, a pillow 354 has an inner cover 355 including an inner surface and an outer surface. The inner cover may be a textile shell. The outer surface, the inner surface, and/or both the outer and inner surfaces of the inner cover 355 are coated with a cooling gel. The treated inner cover is desirably filled with a compliant fill material 356 such as foam, fiber, or latex. The compliant fill material may also be treated with a cooling gel as described above. The inner cover may be closed such as by sewing, serge, etc. The treated inner cover that contains the fill material may be inserted into an outer cover 358. The outer cover 358 is closed, such as by using a zipper, sewing, serge, etc. The outer cover 358 may be treated with a cooling gel or may incorporate a cooling gel layer into a major surface thereof. In one embodiment, the compliant fill material may include memory foam.

Figure 13:
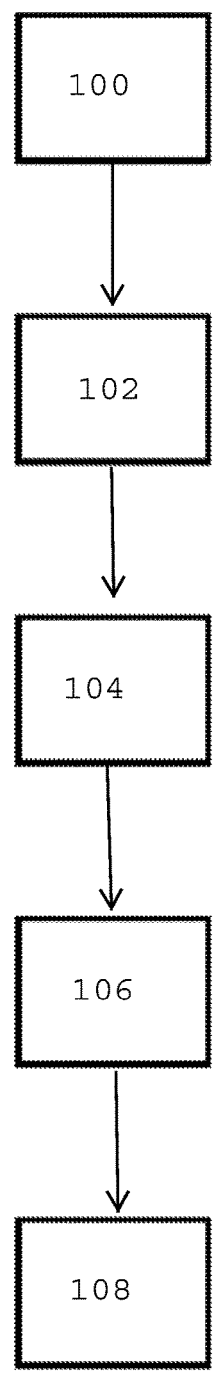
FIG. 13 shows a process diagram of a method of making a sleep product using a mold, a cooling gel composition, and a foaming mixture, in accordance with one embodiment of the present patent application.

In one embodiment, the cooling gel has a unique composition including a mold release element and a phase change material (PCM) element that enables the cooling gel to function as both a mold release agent and a coating for a foam part that provides a cooling effect. Referring to FIG. 13, in one embodiment, after a mold is provided at step 100, the dual function cooling gel is sprayed, brushed, rolled, and/or deposited onto a mold surface at step 102. Next, at step 104, a foam is introduced into the mold. At step 106, the foam rises, preferably while applying heat to the cooling gel and foam composition. The foam part may then be removed from the mold at step 108. The cooling gel has a composition that facilitates removal of the foam part from the mold. After the foam part has been removed from the mold, the cooling gel remains on the outer surface of the foam part to impart a cooling effect for a user.

In one embodiment, the mold release cooling gel may be used with memory foam, reactive polyurethanes, and any of the fiber materials disclosed herein.

In one embodiment, the cooling gel composition may be sprayed, rolled, brushed, and/or deposited onto a previously made foam part.

In one embodiment, the cooling gel may be used as a coating that imparts thermal managing properties to a foam surface using a thermoplastic elastomer that has a high affinity for certain paraffin oils (aliphatic hydrocarbons) that are dissolved in a specialized solvent that quickly flashes away once applied in a thick film. In one preferred embodiment, the cooling gel is a hydrotreated light distillate with mainly 9 to 16 carbons and a viscosity under 10 cP.

In one preferred embodiment, the cooling gel composition comprises:

| | |
|---|---|
| SEPTON 4055 | 2.5% |
| Methyl Amyl Ketone (MAK) | 21.1% |
| Turpenoid Oil | 58.4% |
| Microencapsulated Phase Change Material (PCM) | 18.0% |
| Total | 100% |

In certain preferred embodiments, the solvents used to make the cooling gel may include but are not limited to xylene, n-butyl acetate, methyl acetate, methyl amyl ketone, mineral spirits, and/or iso butyl isobutyrate.

In one embodiment, various blends of solvents are possible to optimize the processing and flash rate of the coating, as well as the odor.

In one embodiment, various tackifiers, plasticizers, oils, lubricants, adhesion promoters, and/or surfactants may be incorporated into the cooling gel to modify the properties of the coating.

In one embodiment, different forms of microencapsulated phase change materials (micro PCM's) may be used to adjust the cooling sensation.

In one embodiment, changes to the PCM material may include but are not limited to changing the melting point of the core material.

In one embodiment, thermoplastics suitable for use may include tri-block co-polymers such as SEBS (styrene block—ethylene-butylene block—styrene block), SEEPS (styrene block—ethylene-ethylene-propylene—styrene block), SBS (styrene block—butadiene block—styrene block), or SEEBS (styrene block—ethylene-ethylene-butylene block—styrene block).

In one embodiment, the cooling gel coating may be applied to the following components: 1) Flat or contoured sleep surfaces comprised of polymeric foam material, such as polyurethane foam; 2) Polyester, nylon, polyethylene, polypropylene, melamine, or other forms of fiber; 3) Molded or contoured pillows of various shapes.

The viscosity of the cooling gel coating may be adjusted for use in the following applications: 1) As a sprayable coating; 2) As a roll coat; 3) As a "dip and nip" applied coating.

In one preferred embodiment of the present invention, the coating may be used as both a mold release and as a cooling gel that remains on the surface of the foam. In one embodiment, the cooling gel coating is sprayed into a mold prior to introducing a foaming mixture that produces a composite of polyurethane foam and the coating. The cooling gel coating has a composition that enables it to serve two functions: 1) a mold release coating; and 2) a cooling gel coating that remains on the surface of the foam after the foam has been removed from the mold to provide a cooling effect.

The cooling gel coating disclosed herein provides numerous advantages over the prior art coatings including the physical properties of the resultant coating, durability, and washability.

Although the present invention is not limited by any particular theory of operation, it is believed that these benefits are due to the ability to swell the high physical property tri-block copolymer thermoplastic material with the uniquely selected parrafin oil.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A method of making a sleep product having a cooling gel layer comprising:
providing a mold;

coating said mold with a cooling gel composition including a mold release agent, wherein said cooling gel composition comprises 2.5% SEPTON 4055, 21.1% Methyl Amyl Ketone (MAK), 58.4% Turpenoid Oil, and 18% Microencapsulated Phase Change Material (PCM) by weight;

introducing a foaming mixture into said mold so that said foaming mixture is in contact with said cooling gel composition;

allowing said foaming mixture to rise and cure into a foam layer having an outer surface covered by said cooling gel composition, wherein said cooling gel composition is configured to function as a mold release coating that facilitates removing said foam layer from said mold and as a coating that remains on the outer surface of said the foam layer after said foam layer has been removed from said mold and that provides a cooling effect at the outer surface of said foam layer.

* * * * *